(12) United States Patent
Higuchi et al.

(10) Patent No.: US 8,939,844 B2
(45) Date of Patent: Jan. 27, 2015

(54) SHELL-TYPE NEEDLE BEARING AND CROSS-TYPE UNIVERSAL JOINT

(75) Inventors: Masato Higuchi, Gunma (JP); Eisho Watanabe, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/699,674

(22) PCT Filed: Jan. 25, 2012

(86) PCT No.: PCT/JP2012/051555
§ 371 (c)(1),
(2), (4) Date: May 22, 2013

(87) PCT Pub. No.: WO2012/102306
PCT Pub. Date: Aug. 2, 2012

(65) Prior Publication Data
US 2013/0237330 A1     Sep. 12, 2013

(30) Foreign Application Priority Data

Jan. 26, 2011 (JP) ................. 2011-013845
Dec. 15, 2011 (JP) ................. 2011-274112

(51) Int. Cl.
| | |
|---|---|
| *F16D 3/41* | (2006.01) |
| *F16D 3/38* | (2006.01) |
| *F16C 33/78* | (2006.01) |
| *F16C 19/22* | (2006.01) |
| *F16C 19/26* | (2006.01) |
| *F16C 33/64* | (2006.01) |

(Continued)

(52) U.S. Cl.
CPC *F16D 3/41* (2013.01); *F16D 3/385* (2013.01); *F16C 33/7809* (2013.01); *F16C 33/7823* (2013.01); *F16C 33/7886* (2013.01); *F16C 33/7889* (2013.01); *F16C 19/225* (2013.01); *F16C 19/26* (2013.01); *F16C 33/64* (2013.01); *F16C 19/44* (2013.01); *F16C 33/58* (2013.01)
USPC ........... 464/131; 464/132; 277/321; 277/562; 384/625

(58) Field of Classification Search
USPC .................. 464/128–133; 384/625; 277/321, 277/562–568
See application file for complete search history.

(56) References Cited

U.S. PATENT DOCUMENTS

| | | | | |
|---|---|---|---|---|
| 3,352,127 | A | * | 11/1967 | Skinner, Sr. ................. 464/131 |
| 4,337,953 | A | * | 7/1982 | Ikeda et al. ............... 277/567 X |
| 5,700,094 | A | * | 12/1997 | Dam et al. ................ 384/625 X |

(Continued)

FOREIGN PATENT DOCUMENTS

| | | |
|---|---|---|
| GB | 1012540 A | 12/1965 |
| JP | 57-102728 U | 6/1982 |

(Continued)

OTHER PUBLICATIONS

Extended European Search Report issued Sep. 17, 2014, in European Patent Application No. 12739717.2.

*Primary Examiner* — Gregory Binda
(74) *Attorney, Agent, or Firm* — Miles & Stockbridge P.C.

(57) ABSTRACT

Cross-type universal joint and a shell-type needle bearing that is used therein. The portions on the outer surface of the shell-type outer ring for which there is a possibility of coming in sliding contact with the tip end edges of at least two seal lips of a plurality of seal lips of a seal ring are selectively covered with a corrosion resistant coating. Preferably, the entire outer surface of the shell-type outer ring is covered by a chemically treated film having anti-corrosion properties.

17 Claims, 8 Drawing Sheets

(51) Int. Cl.
  *F16C 19/44* (2006.01)
  *F16C 33/58* (2006.01)

(56) References Cited

U.S. PATENT DOCUMENTS 7,503,697 B2 * 3/2009 Tsuji et al. ............... 384/625 X
2008/0032804 A1 * 2/2008 Nagayama et al. ........... 464/128

FOREIGN PATENT DOCUMENTS

| JP | 08-135674 A | 5/1996 |
| JP | 09-060650 A | 3/1997 |
| JP | 2001-099175 A | 4/2001 |
| JP | 2002-146837 A | 5/2002 |
| JP | 2002-181068 A | 6/2002 |
| JP | 2002-294465 A | 10/2002 |
| JP | 2005-048809 A | 2/2005 |
| JP | 2006-029551 A | 2/2006 |
| JP | 2009-008135 A | 1/2009 |
| JP | 2010-181015 A | 8/2010 |
| JP | 2010-181016 A | 8/2010 |

* cited by examiner

SHELL-TYPE NEEDLE BEARING AND CROSS-TYPE UNIVERSAL JOINT

TECHNICAL FIELD

The present invention relates to a shell-type needle bearing that has a shell-type outer ring that is formed by bending a metal plate into a cylindrical shape with a bottom, and that is used in a state wherein the space between the opening end section of the outer ring and the outer circumferential surface of a shaft that is inserted into the inner diameter side of the outer ring is covered by a seal ring, and a cross-type universal joint in which this shell-type needle bearing is assembled.

BACKGROUND ART

A cross-type universal joint can be assembled in the connecting section between the end section of a drive shaft of the drive system of an automobile and a different rotating shaft, and is capable of transmitting torque between the drive shaft and rotating shaft that are non-linearly arranged. A cross-type universal joint can be assembled between the steering shaft and intermediate shaft, or between the intermediate shaft and pinion shaft of the steering gear unit of a steering apparatus for an automobile, and can transmit torque between these shafts that are non-linearly arranged. Construction of a cross-type universal joint such as disclosed in JP 8-135674 (A), JP 9-60650 (A), JP 2005-48809 (A), JP 2006-29551 (A), JP 2010-181015 (A) and JP 2010-181016 (A) has been widely known.

Figure 10:
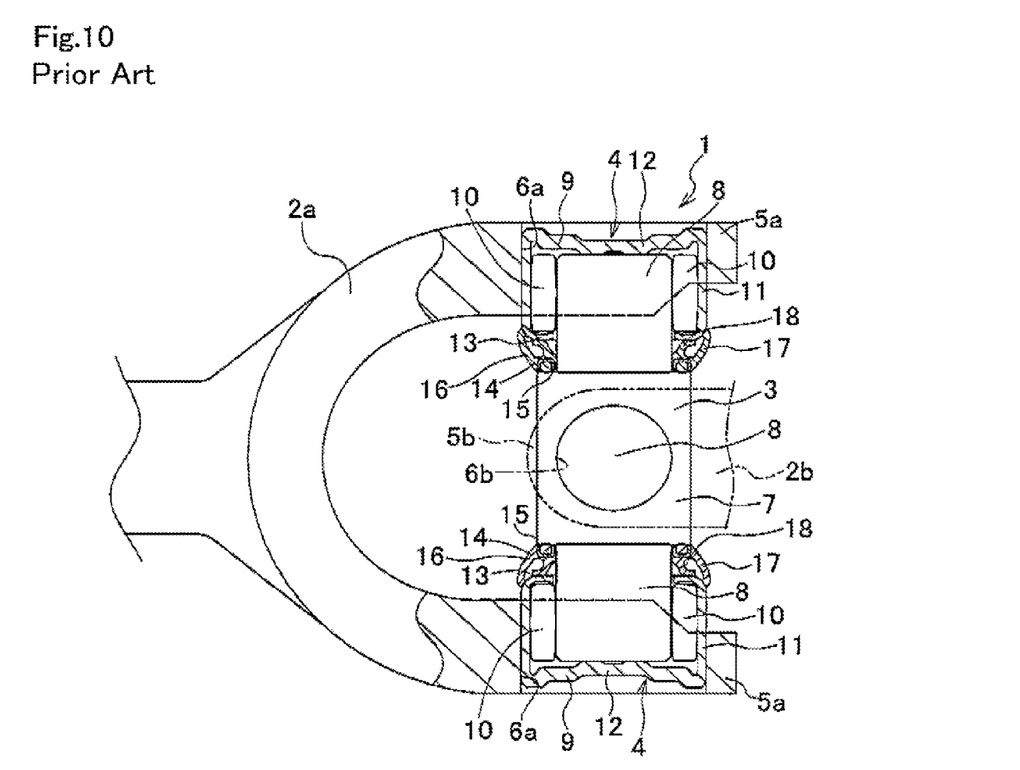
FIG. 10 is a partial cross-sectional view illustrating a universal joint in which a shell-type needle bearing of the present invention is assembled, with part of the being omitted.

FIG. 10 illustrates an example of a conventional cross-type universal joint. This universal joint 1 joins a pair of yokes 2a, 2b and one joint cross 3 by way of four shell-type needle bearings 4 so that relative displacement is possible. The yokes 2a, 2b are formed into a forked shape having a pair of arm sections 5a, 5b, and circular holes 6a, 6b are formed on the tip end sections of each of these arm sections 5a, 5b. The circular holes 6a (6b) that are formed on the tip end sections of the same yoke 2a (2b) are concentric with each other. Moreover, the joint cross 3 is formed by uniformly arranging four shaft sections 8 in a radial manner around the outer circumferential direction of a connection base section 7. By supporting the shaft sections 8 inside the circular holes 6a, 6b by way of shell-type needle bearings 4 so that pivotal displacement is possible, the yokes 2a, 2b of the universal joint 1 are connected by way of the joint cross 3 such that pivotal displacement is possible and so that torque can be freely transmitted.

The shell-type needle bearings 4 comprise one shell-type outer ring 9 and a plurality of needles 10. The shell-type outer ring 9 is formed by plastic working such as deep drawing to bend a hard metal plate, such as a carbon steel plate, and comprises a cylindrical section 11, a bottom plate section 12 and an inward-facing collar section 13. The bottom plate section 12 entirely covers one end in the axial direction of the cylindrical section 11 (outside surface side of the arm sections 5a, 5b when assembled in the circular holes 6a, 6b). Moreover, the inward-facing collar section 13 is bent inward in the radial direction from the other end in the axial direction of the cylindrical section 11 (inside surface side of the arm sections 5a, 5b when assembled in the circular holes 6a, 6b), and is curved in a direction so that the surface that faces the needles 10 is a concave surface.

The shell-type needle bearings 4 are assembled with the respective shell-type outer rings 9 fitted into the respective circular holes 6a, 6b with an interference fit and with the shaft sections 8 of the joint cross 3 inserted on the inside of the needles 10. This assembly work is performed with the shaft sections 8 inserted in the circular holes 6a, 6b by press fitting the shell-type needle bearings 4 into the circular holes 6a, 6b from the opening on the outside surface side of the arm sections 5a, 5b. Moreover, the seal ring 14 is fitted and supported beforehand around the base end section of the shaft sections 8 with an interference fit. In the assembled state, the inner circumferential surface of the cylindrical section 11 of the shell-type outer ring 9 functions as an outer ring raceway, and the outer circumferential surface of the shaft section 8 functions as an inner ring raceway.

The seal ring 14 is formed such that an elastic member 16 is reinforced by a metal core 15. The elastic member 16 comprises a radial seal lip 17 and a thrust seal lip 18. When the joint cross 3 and shell-type outer ring 9 are combined and to form the universal joint 1, the edge on the tip end of the radial seal lip 17 comes in elastic contact around the entire circumference of the portion of the outer circumferential surface of the shell-type outer ring 9 near the opening end. In this state, the seal ring 14 seals the inner space of the shell-type outer ring 9 from the external space, and together with preventing lubricant such as grease and the like that is on the inside of the shell-type outer ring 9 from leaking to the outside, prevents foreign matter from getting inside the shell-type outer ring 9 from the outside. The shape of the seal lip, as disclosed in JP 2010-181015 (A) and JP 2010-181016 (A), can have triple seal ring construction by forking the tip end sections of a radial seal lip.

When using a universal joint 1 that is constructed in this way and assembled in the connecting section between the end section of a drive shaft and another rotating shaft, from the aspect of both making the universal less expensive and maintaining durability, there is room for improvement as will be described below. First, in order to reduce costs, carbon steel plate such as case hardening steel or bearing steel having a low procurement cost is preferably used as the metal plate for the shell-type outer ring 9 that is assembled in the shell-type needle bearing 4. However, in the case of carbon steel plate, when used in severe operating conditions, corrosion of the surface cannot be avoided. For example, in the case of assembling a universal joint 1 in the drive system of an automobile, such as in the propeller shaft, corrosive material such as muddy water that is splashed up as the vehicle travels, or water that is mixed with a snow melting agent adheres to the surface of the shell-type outer ring 9, and rusting occurs on this surface.

Figure 11:
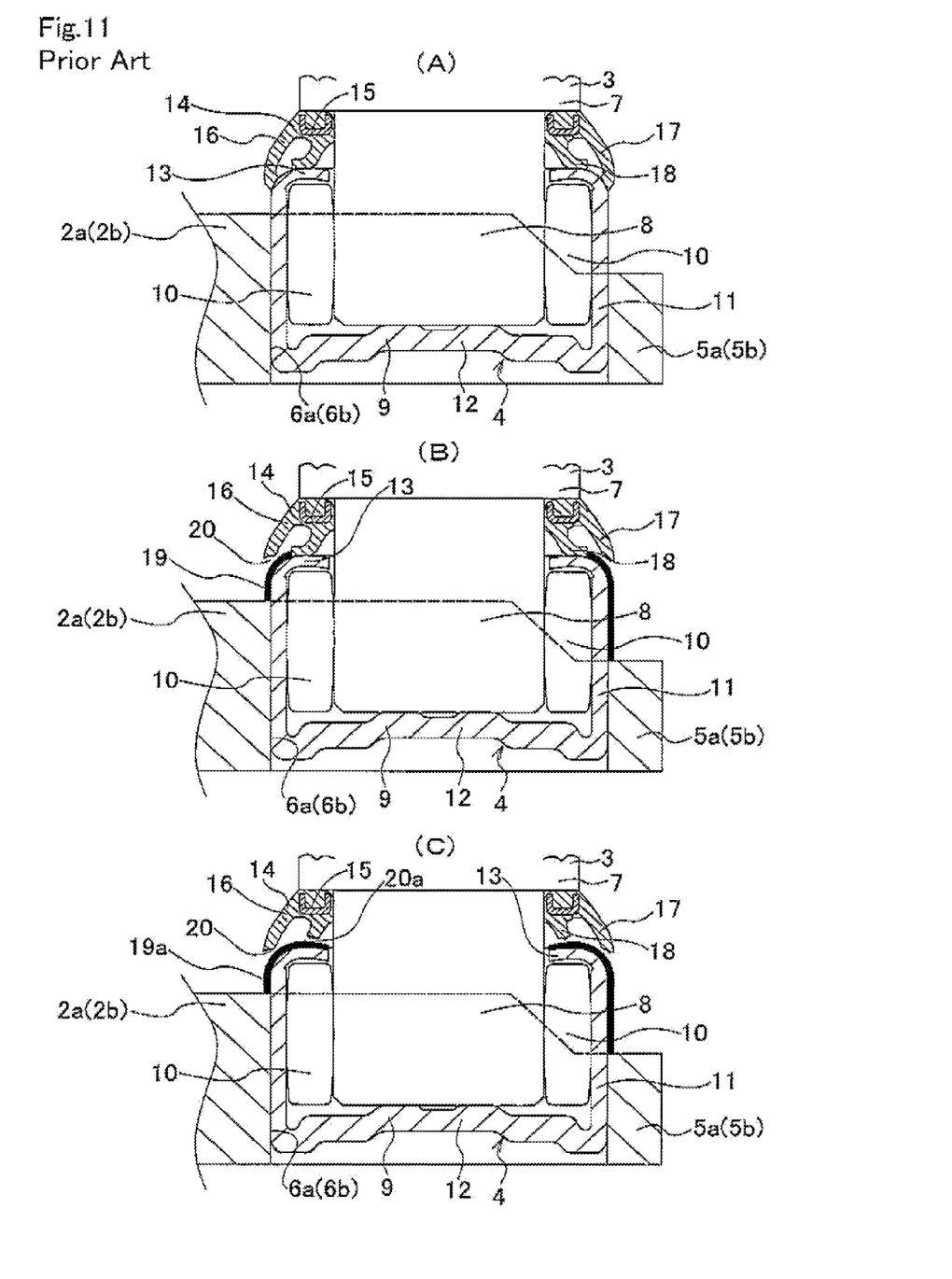
FIG. 11A to FIG. 11C are partial cross-sectional views illustrating the main parts in order of advancement of wear of the tip end section of seal lips of a seal ring due to corrosion of the outer surface of a shell-type outer ring.

The portion of the surface of the shell-type outer ring 9 where rusting occurs becomes rough, or in other words, becomes a rough surface having a large friction coefficient, so there is strong friction against the tip end edges of the seal lips 17, 18 of the seal ring 14, and thus wear of these seal lips 17, 18 advances. For example, as illustrated in FIG. 11A, in the initial stage, even when the tip end edges of the seal lips 17, 18 come in contact around the entire circumference of the surface of the shell-type outer ring 9 such that there are no spaces, when rust 19 occurs on part of the surface of the shell-type outer ring 9 as illustrated in FIG. 11B, first, the edge of the tip end of the radial seal lip 17 wears due to rubbing against this rust 19. As a result, a space 20 occurs between the tip end edge of this radial seal lip 17 and the surface of the shell-type outer ring 9. Consequently, corrosive material enters through this space 20 beyond the radial seal lip 17, and as illustrated in FIG. 11C, rust 19a occurs on the surface of the shell-type outer ring 9 that reaches the deep section. Due to rubbing against this rust 19a, the tip end edge of the thrust seal lip 18 also wears, and a space 20a also occurs between the tip end edge of this thrust seal lip 18 and the surface of the shell-type outer ring 9. As a result, the seal by the seal lips 17, 18 decreases or is lost, and it becomes impossible to prevent lubricant from leaking out or prevent foreign matter from getting inside.

As disclosed in JP 2010-181015 (A), rust-proof coating of the surface of the universal joint, including the surface of the shell-type needle bearing, may be performed after assembly. However, in this case, not only is there a possibility that the performance of the seal will decrease due to unevenness of the coating film, but there is also a possibility that as relative displacement occurs between the seal ring and the shell-type outer ring, corrosive material will adhere to the portion of the surface of the shell-type outer ring that is not covered by the coating film, and corrosion will advance from that portion. By coating the enter outer surface of the shell-type outer ring before assembly in the yoke, it is possible to solve this problem, however, the dimension of the outer diameter of the shell-type outer ring increases by the amount of the coating film, so there is a problem in that not only is the work of press fitting the shell-type outer ring into the circular holes on the yoke side hindered, but the dimensional precision after pressure fitting also worsens.

By constructing the shell-type outer ring 9 using stainless steel plate, it is possible to suppress the occurrence of rust 19, 19a, and improve the durability of the universal joint 1 in which the shell-type needle bearing 4 is assembled. However, stainless steel plate is not only more expensive than carbon steel plate, the drawing process for drawing a part that has the necessary hardness is troublesome, and the processing itself is not only difficult, but also increases processing costs. Therefore, in consideration of lowering costs, it is preferred that the use of stainless steel plate be avoided.

JP 2002-146837 (A) and JP 2002-294465 (A) disclose construction wherein a chemically treated coating for preventing rust, such as an insoluble metal phosphate treated film or phosphate treated film, is formed on the surface of the component parts, such as the outer ring, of rolling bearing. These chemically treated films hardly increase the outer diameter dimension of the outer ring, and to a certain extent are expected to be able to prevent rust. In addition, by performing this kind of processing, it is possible during the required period of use of the universal joint to prevent the formation of holes through the shell-type outer ring and prevent corrosion to an extent that would cause the strength to remarkably decrease. However, in the case of severe operating conditions, it would be possible that thin rusting occurs on the surface thereof. Wear of the tip end edge of the seal rip progresses due to the thin rusting. Therefore, in the case of severe operation conditions, the formation of this kind of chemically treated film may not be completely sufficient from both the aspect of maintaining good seal performance of the seal ring over a long period of time, and maintaining durability of the universal joint in which a shell-type needle bearing is assembled.

RELATED LITERATURE

Patent Literature

[Patent Literature 1] JP 8-135674 (A)
[Patent Literature 2] JP 9-60650 (A)
[Patent Literature 3] JP 2005-48809 (A)
[Patent Literature 4] JP 2006-29551 (A)
[Patent Literature 5] JP 2010-181015 (A)
[Patent Literature 6] JP 2010-181016 (A)
[Patent Literature 7] JP 2002-146837 (A)
[Patent Literature 8] JP 2002-294465 (A)

SUMMARY OF THE INVENTION

Problem to be Solved by the Invention

In consideration of the situation above, the object of the present invention is to achieve construction of a shell-type needle bearing and cross-type universal joint that are capable of both lowering cost and maintaining durability.

Particularly, the object of the present invention is to achieve construction of a cross-type universal joint that, even when used under severe operating conditions, is capable of suppressing wear of the tip end edges of the seal lips of a seal ring that is provided between the base end section of the shaft section of the joint cross and the opening section of a shell-type outer ring of a shell-type needle bearing, and is capable of preventing foreign matter from getting inside the shell-type outer ring.

MEANS FOR SOLVING THE PROBLEMS

The shell-type needle bearing of the present invention, comprises:

a shell-type outer ring that is formed by bending a metal plate and comprises a cylindrical section, a bottom plate section that covers the entire one end side in the axial direction of the cylindrical section, and an inward-facing collar section that is bent inward in the radial direction from the other end side in the axial direction of the cylindrical section, this shell-type outer ring during use being fastened inside a circular hole that is formed in an outside member; and a plurality of needles that are provided on the inner-diameter side of the shell-type outer ring so as to be able to roll freely; and at least part of a portion of the outer surface of the shell-type outer ring that is separated from the circular hole is covered by a corrosion resistant coating.

Preferably, as at least the part of a portion that is separated from the circular hole, a portion near the other end in the axial direction of the outer surface of the shell-type outer ring, where there is a possibility that a tip end edge of a seal lip of a seal ring that is fitted around and fastened to the outer circumferential surface of a shaft section that is inserted into the inner-diameter side of the needles will come in sliding contact, is covered by the corrosion resistant coating.

Of the portion where the there is a possibility that the tip end edge of the seal lip will come in sliding contact, the outside surface of the inward-facing collar section and the outer surface of the continuous section between this inward-facing collar section and the cylindrical section may be selectively covered by the corrosion resistant coating.

Alternatively or additionally, it is preferred that the bottom plate section be located on the inside of the circular hole, and the outside surface of this bottom plate section be covered by the corrosion resistant coating.

Particularly, it is preferred that when used in a cross-type universal joint that is applied to uses subjected to severe operating conditions, the entire outer surface of the shell-type outer ring be covered by a chemically treated film having anti-corrosion properties.

The cross-type universal joint of the present invention comprises:

a pair of yokes that are formed in a forked shape and comprises a pair of arm sections, and circular holes that are formed in the tip end sections of the arm sections so as to be concentric with each other;

a joint cross that comprises a connection base section, and four shaft sections that are fastened to the outer circumferential surface of the connection base section in a radial manner, and that is combined with the pair of yokes with the shaft sections inserted inside the circular holes respectively; and four shell-type needle bearings that are provided between the outer circumferential surfaces of the shaft sections and the inner circumferential surfaces of the circular holes; and each of the shell-type needle bearings is any one of the shell-type needle bearings of the present of the present invention described above.

The cross-type universal joint of the present invention further comprises four seal rings, each of the four seal rings having:

a base section that is fastened around and supported by the base end section of each of the shaft sections; and a radial seal lip and a thrust seal lip that are provided between the base end section of each of the shaft sections and the opening section of each of the shell-type outer rings, the radial seal lip coming in sliding contact with all around the circumferential surface of the other end section in the axial direction that protrudes from the circular hole of the outer surface of the shell-type outer ring, and the thrust seal lip coming in sliding contact with all around the outside surface of the inward-facing collar section of the shell-type outer ring; and the other end sections in the axial direction of the outer circumferential surface of the cylindrical section and the outside surface of the inward-facing collar section of each of the shell-type outer rings are continuously covered with the corrosion resistant coating.

Alternatively, the cross-type universal joint of the present invention further comprises four seal rings, each of the four seal rings having:

a base section that is fastened around and supported by the base end section of each of the shaft sections; and seal lips that are provided between the base end section of each of the shaft sections and the opening section of each of the shell-type outer rings, each of the seal lips comprising a tip end edge that comes in sliding contact with all around the outer surface of a portion on the other end side in the axial direction of each of the shell-type outer ring that protrudes from the inside surface of the arm section; and a portion of the outer surface of the portion on the other end side in the axial direction of each of the shell-type outer ring that protrudes from the inside surface of the arm section that comes in sliding contact with the tip end edges of at least two of the seal lips other than the outermost seal lip, is covered with the corrosion resistant coating.

Technology of forming a chemically treated film over the entire surface of the shell-type needle bearing of the present invention in order to provide the entire surface with a certain amount of resistance to corrosion, with forming a coating for improving corrosion resistance on only the necessary portions that particularly require a high degree of resistance to corrosion can also be applied to rolling bearings other than a shell-type needle bearing. In other words, in a radial rolling bearing that comprises an outer ring having an outer ring raceway formed around the inner circumferential surface, an inner ring having an inner ring raceway formed around the outer circumferential surface, and a plurality of rolling elements that are located between the outer ring raceway and inner ring raceway so as to be able to roll freely, it is possible to obtain the same function and effect by covering the entire outer surface of at least one of the rings, in other words the outer ring and inner ring, that are formed using bearing steel by performing forging, machining, and grinding with a chemically treated film having anti-corrosion properties, and covering only a portion which is a part of the outer surface of this ring and where there is a possibility that the tip end edges of seal lips will come in sliding contact with a coating for improving corrosion resistance.

EFFECT OF THE INVENTION

In the case of the shell-type needle bearing and cross-type universal joint of the present invention, basically a corrosion resistant coating is not formed on the portion of the outer circumferential surface of the shell-type outer ring that fits inside a circular hole in an outside member (tip end section of the arm section of the yoke) with an interference fit, and in the case that a corrosion resistant coating is used, the thickness is extremely small. On the other hand, in the case of uses in particularly severe operating conditions, only a chemically treated film is used. The film thickness of this chemically treated film is very thin, so hardly increases the dimension of the outer diameter of the shell-type outer ring. Therefore, fitting and fastening the shell-type outer ring inside the circular hole of the outside member with an interference fit can be performed with no problem, and hardly any shavings occur due to part of the film scraping off during the fitting work.

On the other hand, portions that require a particularly high degree of resistance to corrosion such as the portions that come in sliding contact with the seal lips are selectively covered with corrosion resistant film, so rusting of these portions is completely prevented. Therefore, the advancement of wear of the tip end edges of the seal lips due to rubbing against the surface of the shell-type outer ring that is rough due to rusting (corrosion products) is effectively prevented. With the construction of the present invention, a shell-type needle bearing and cross-type universal joint is achieved for which cost can be lowered and durability can be maintained.

Moreover, in the cross-type universal joint of the present invention, in the case of a seal ring having three seal lips, there is a low possibility of foreign matter passing through all of the areas of sliding contact between the tip end edges of these three seal lips and the outer surface of the shell-type outer rings and getting inside the shell-type outer rings. Moreover, portions on the outer surface of the shell-type outer rings that come in sliding contact with the tip end edges of at least two seal lips, except for the seal lip that is the furthest on the outside, are covered with a corrosion resistant coating, so that advancement of wear of the tip end edges of at least these two seal lips due to rust occurring on the outer surface of the shell-type outer ring is suppressed. Even in the case where wear of the tip end edge of the outermost seal lip occurs, a labyrinth seal is formed with the outer circumferential surface of the shell-type outer ring, so the function of suppress the amount of foreign matter that gets inside at least the two seal lips is maintained. As a result, due to these three seal lips, it is possible to maintain well the effect of preventing foreign matter from getting inside the shell-type outer rings over a long period of time, and it is possible to adequately maintain the durability of the cross-type universal joint.

MODES FOR CARRYING OUT THE INVENTION

[Embodiment 1, Example 1]

Figure 1:
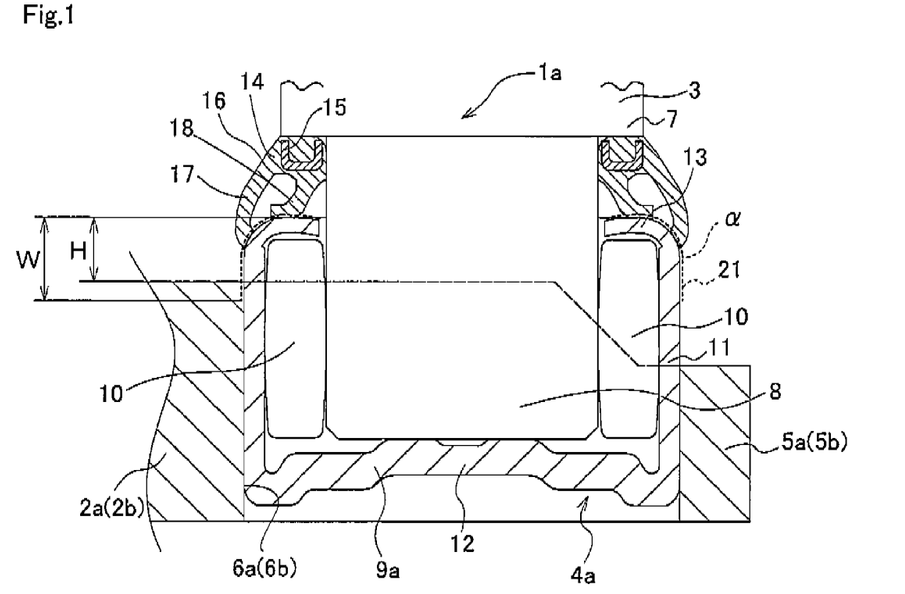
FIG. 1 is a cross-sectional view illustrating the main parts of a first example of a first embodiment of the present invention.

FIG. 1 illustrates a first example of a first embodiment of the present invention. A feature of the first embodiment of the present invention, including this first example, is that in order to achieve construction of a shell-type needle bearing and cross-type universal joint that are capable of both lowering cost and maintaining durability, a film that is formed on the surface of the shell-type outer ring for protecting against corrosion is devised. The construction and function of the other parts are the same as in the conventional construction, so drawings and explanations of identical parts will be omitted or simplified, such that the explanation below centers on the features of the present invention.

The shell-type outer ring 9a of the shell-type needle bearing 4a of this example is formed by bending a metal plate and comprises: a cylindrical section 11; a bottom plate section 12 that covers the entire one end side in the axial direction of the cylindrical section 11; and an inward facing collar section 13 that bends inward in the radial direction for the other end side in the axial direction of the cylindrical section 11. The outer surface of the shell-type outer ring 9a of this example, in other words, the outside surface of the bottom plate section 12, the outside surface of the inward facing collar section 13 and the entire outer circumferential surface of the cylindrical section 11 is covered by a iron phosphate film, which is a chemically treated film having anti-corrosion properties. The method for forming this iron phosphate file is not particularly limited. It is possible to use a typical processing method such as spraying commercially sold iron phosphate first surface treatment agent, or immersing the surfaces in this first surface treatment agent. By simply performing this kind of first surface treatment on the outer surfaces of the shell-type outer ring 9a, it is possible to degrease the outer surface of the shell-type outer ring 9a, while at the same time form a chemically treated film (iron phosphate film) on the outer surfaces. It is also possible to use other well-known rust-prevention agents or base coating agents (for example, agents for forming a zinc phosphate film) as the surface treatment agent for forming a chemically treated film. Moreover, before performing the chemical treatment, it is also possible to perform separate degreasing using a well-known degreasing agent. Furthermore, depending on the conditions for use, it may also be possible to omit the formation of a chemically treated film. However, preferably, except for the areas of contact with the inner surfaces of the circular section 11, this kind of chemically treated film will be formed at least on the outer surfaces of the shell-type outer ring 9a, and more preferably, a chemically treated film will exist on all surfaces as in this example.

Furthermore, the portion of the outer surface of the shell-type outer ring 9a that is indicated by the dashed line cc in FIG. 1 is covered by a corrosion-resistant coating 21. In other words, a corrosion-resistant coating 21 is formed on the end section near the opening (end section on the opposite side from the bottom plate section 12) of the outer peripheral surface of the cylindrical section 11 of the shell-type outer ring 9a, and on the outside surface of the inward-facing collar section 13 that is formed on the perimeter edge of the opening of the shell-type outer ring 9a. The type of material used for forming this corrosion-resistant coating 21 is not particularly limited as long as it has good adherence to the steel plate of the shell-type outer ring 9a, can be easily formed into a coating, has sufficient anti-corrosion properties, and can make the surface a flat and smooth surface. For example, preferably an epoxy resin type coating material can be used.

In this example, based on the torque that is applied between the yokes 2a (2b) and the joint cross 3 when assembled in the cross-type universal joint la, the range where the coating 21 is formed is a portion that is a little larger than a portion that completely includes the portion where there is a possibility that the tip end edges of the radial lip 17 and thrust lip 18 of the seal ring 14 that are assembled at the same time in the cross-type universal joint 1a will come in sliding contact. In other words, even when the torque becomes large, the amount of elastic displacement of the yokes 2a (2b) or joint cross 3 becomes large, and the tip end edges of the seal lips 17, 18 shift from the position indicated in FIG. 1, the width of the coating 21 is large enough so that these tip end edges do not separate from the coating 21. More specifically, the coating 21 exists continually from a position that reaches the inner circumferential edge of the outside surface of the inward-facing collar section 13 to a position on the outer circumferential surface of the cylindrical section 11 that enters just a little (for example, 0.5 mm to 1 mm) inside the circular holes 6a (6b). In other words, when the protruding amount of the shell-type outer ring 9a from the inside surface of the portion except the tip end section of the inside surface of arm sections 5a (5b) of the yokes 2a (2b) is taken to be H, and the distance from the other end surface of this shell-type outer ring 9a (outside surface of the inward-facing collar section 13) to the end section on one end in the axial direction of the coating 21 is taken to W, then W−H=0.5 mm to 1 mm. The coating 21 is formed in only a specified range, so in a state wherein in addition to performing masking using a cover or tape from the bottom plate section 12 to the middle section in the axial direction of the cylindrical section 11, the opening on the inner diameter side of the inward-facing collar section is covered with a cap, spray work is performed for forming the coating 21.

With the construction above, it is possible to both lower costs and maintain durability of a shell-type needle bearing 4a and a cross-type universal joint la in which the shell-type needle bearing 4a is assembled. In other words, in the case of the construction of this example, only a chemically treated film exists in a large portion of the portion on the outer circumferential surface of the cylindrical section 11 of the shell-type outer ring 9a that fits inside the circular holes 6a (6b) of the yokes 2a (2b) with an interference fit. The film thickness of this chemically treated film is very thin, so it hardly increases the dimension of the outer diameter of the shell-type outer ring 9a. Part of the coating 21 (part in the circumferential direction of the portion having a 0.5 mm to 1 mm width) fits inside the circular holes 6a (6b), however, that portion is kept very small. Moreover, in the final stage of the work of fitting the cylindrical section 11 inside the circular holes 6a (6b) with an interference fit, this portion as well is pushed inside the circular holes 6a (6b), In this example, the thickness of the coating 21 is greater than the thickness of the chemically treated film, but is kept to about 0.005 mm to 0.015 mm. Therefore, the existence of the coating 21 hardly interferes with the work of fitting the shell-type needle bearing 4a inside the circular holes 6a (6b), and this coating 21 is hardly scraped off at all during the fitting work.

In the completed assembled state of the cross-type universal joint 1a, as illustrated in FIG. 1, four shaft sections 8 that are fastened around the outer circumferential surface of the connection base section 7 of the joint cross 3 are respectively inserted inside the circular holes 6a (6b) that are formed in the tip end sections of the arm sections 5a (5b) of the yokes 2a (2b) by way of the shell-type needle bearing 4a of this example. Seal rings 14 are fitted onto the portion of the outer circumferential surface of the shaft sections 8 (base end sections of the shaft sections 8) that are inserted on the inner-diameter side of the needles of the shell-type needle bearing 4a that protrudes toward the other end side in the axial direction from the cylindrical section 11 (inner end side when assembled in the yokes). Each of the seal rings 14 comprises a base section that is fitted around and supported by the base end section of the shaft sections 8, a radial seal lip 17 that comes in sliding contact with all around the outer circumferential surface of the other end section in the axial direction of the outer surface of the shell-type outer ring 9a that protrudes from the circular hole 6a (6b), and a thrust seal lip 18 that comes in sliding contact with all around the outside surface of the inward-facing collar section 13 of the shell-type outer ring 9a of the outer surface of the shell-type outer ring 9a. The base end section of each of the seal lips 14 is reinforced by a ring shaped metal core 15.

In this example, the tip end edges of the radial seal lip 17 and the thrust seal lip 18 come in sliding contact with the portion on the surface of the corrosion-resistant coating 21 that is near the center side which is sufficiently separated from the both end edges in the width direction of the coating 21. The surface of the coating 21 is flat and smooth, and has sufficient and excellent resistance to corrosion. Therefore, even when using for long periods of time in severe corrosive environments, the surface of the portion that comes in sliding contact with the tip end edges of the radial seal lip 17 and thrust seal lip 18 does not become rough. In other words, wear of the tip end edges of these seal lips does not advance due to rubbing against the surface of the shell-type outer ring that has become rough due to rust as occurred in the case of the conventional construction.

[Embodiment 1, Example 2]

Figure 2:
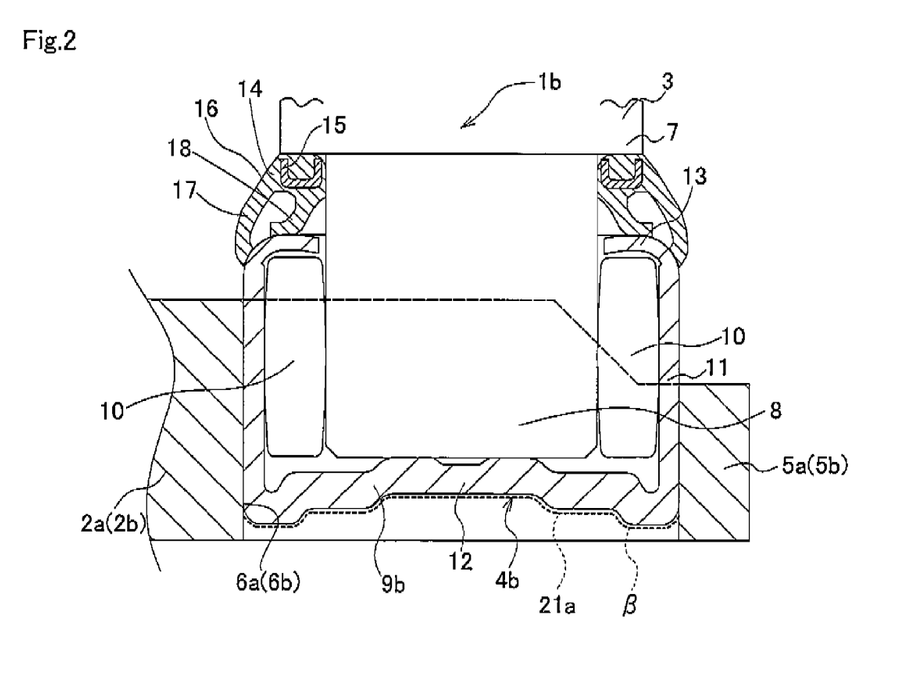
FIG. 2 is a cross-sectional view illustrating the main parts of a second example of a first embodiment of the present invention.

FIG. 2 illustrates a second example of the first embodiment of the present invention. In this example, a corrosion-resistant coating 21a is formed on the outside surface of the bottom plate section 12 of the outer surface of the shell-type outer ring 9b as indicated by the dashed line β in FIG. 2. This bottom plate section 12 exits in a portion that is recessed a little more than the outside surface of the yoke 2a (2b), so it becomes easy for corrosive matter such as muddy water that contains snow-melting salt to build up in the portion surrounded by the inner circumferential surface of the circular hole 6a (6b) and the bottom plate section 12, and thus the condition becomes very severe as a corrosive environment.

Typically, by forming a chemically treated film having corrosion resistant properties on the outer surface of the shell-type outer ring 9b, corrosion that will bring about an occurrence of through holes and a decrease in strength in the bottom plate section does not occur. However, by forming a corrosion-resistant film 21a on the bottom plate section 12 as in the construction of this example, it is possible to further improve the durability of this bottom plate section 12. The characteristics of the coating material of this coating 21a are the same as those of the coating material of the coating 21 of the first example.

[Embodiment 1, Example 3]

Figure 3:
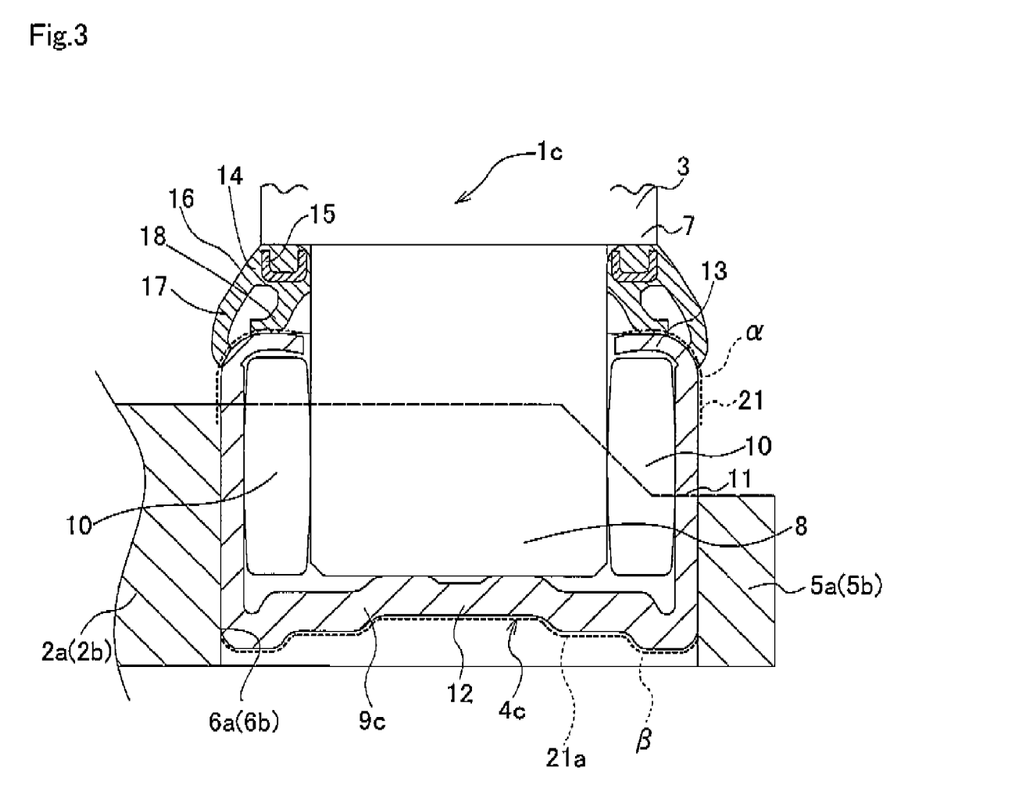
FIG. 3 is a cross-sectional view illustrating the main parts of a third example of a first embodiment of the present invention.

FIG. 3 illustrates a third example of the first embodiment of the present invention. In this example, a coating 21 is formed on the outer circumferential surface of the cylindrical section 11 of the shell-type outer ring 9c on the end section near the opening, and on the outside surface of the inward-facing collar section 13, and a coating 21a is formed on the outside surface of the bottom plate section 12. Therefore, the same function and effect of the first and second examples of the first embodiment can be obtained.

[Embodiment 2, Example 1]

Figure 4:
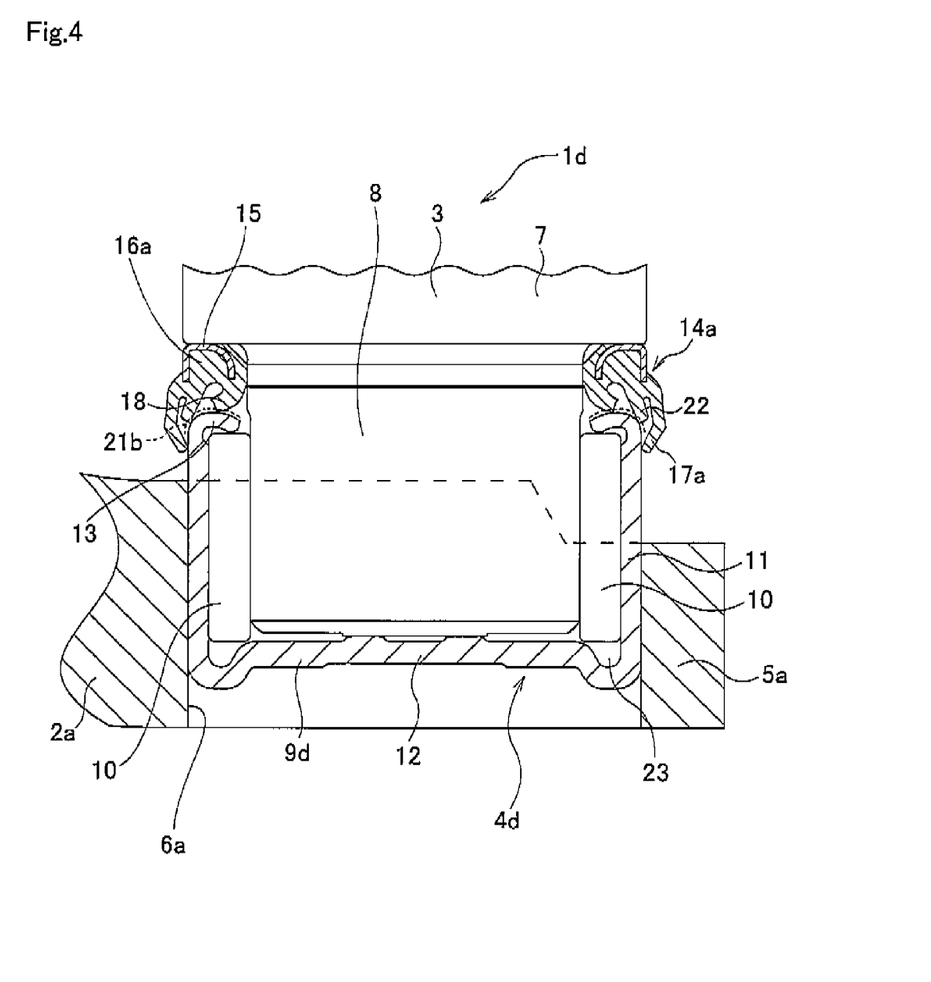
FIG. 4 is a cross-sectional view illustrating the main parts of a first example of a second embodiment of the present invention.
Figure 5:
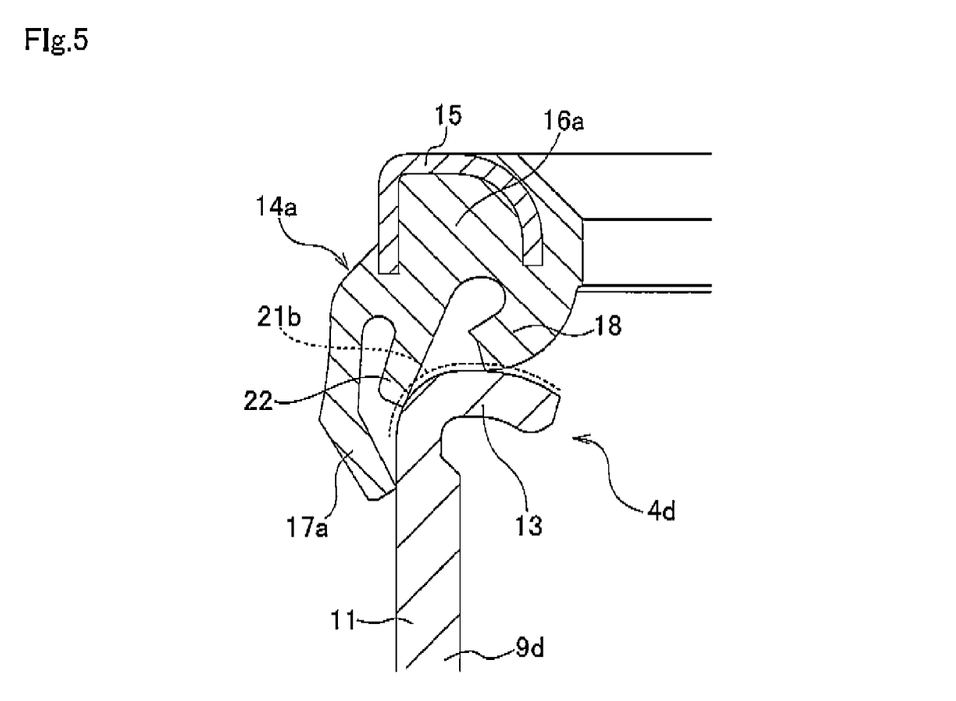
FIG. 5 is an enlarged view of the upper left portion of FIG. 4.

FIG. 4 and FIG. 5 illustrate a first example of a second embodiment of the present invention. A feature of this second embodiment of the present invention is the construction of a seal ring 14 is devised in order to seal the space between the shaft section 8 of the joint cross 3 of a cross-type universal joint and the opening section of a shell-type outer ring 9d, and to cover necessary locations on the outer surface of the shell-type outer ring 9d with a corrosion-resistant film 21b for preventing rust.

The seal ring 14a of the cross-type universal joint of this example comprises in order from the internal space 23 side where the needles 10 are arranged, a thrust seal lip 18, which is an inside seal lip, an intermediate seal lip 22, and a radial seal lip 17a, which is an outside seal lip, such that there are three seal lips 18, 22 and 17a. The base section of the seal ring 14a is also reinforced by a ring shaped metal core 15. In this example, the tip end edges of these seal lips 18, 22, 17a come in sliding contact with all around the outer surface of the shell-type outer ring 9d. In other words, the tip end edge of the thrust seal lip 18 comes in elastic sliding contact with all around the outside surface of the inward-facing collar section 13, the tip end edge of the intermediate seal lip 22 comes in elastic sliding contact with all around the continuous section between the inward-facing collar section 13 and the cylindrical section 11, and the tip end edge of the radial seal lip 17a comes in elastic sliding contact with all around the outer circumferential surface of the cylindrical section 11.

In this second embodiment of the present invention, differing from the first embodiment of the invention, the number of seal lips is increased from two to three, and the tip end edge of the radial seal lip 17a, which is an outside seal lip, comes in sliding contact with the straight part of the outer circumferential surface of the cylindrical section 11 that extends straight in the axial direction where the outer circumferential surface of the shell-type outer ring 9d does not change, instead of coming in sliding contact with the continuous section between the inward-facing collar section 13 and cylindrical section 11 where the outer diameter of the outer circumferential surface of the shell-type outer ring 9d changes. By causing the tip end edge of the radial seal lip 17a to come in sliding contact with the straight part of the outer circumferential surface of the shell-type outer ring 9d in this way, even when the radial seal lip 17a displaces in the axial direction due to torque that is applied between the yoke 1a (2b) and the joint cross 3, the contact pressure (surface pressure)

between the radial seal lip 17a and the outer circumferential surface of the shell-type outer ring 9d does not change, and it is possible to avoid the effect caused of space occurring in the axial direction.

Furthermore, on the opening end section side of the shell-type outer ring 9d where the inward-facing collar section 13 is formed, the portion of the outer surface of the portion that protrudes from the inside surface of the arm section 5a of the yoke 2a where the tip end edges of the thrust lip 18 and intermediate lip 22 coming in sliding contact is covered by a corrosion-resistant coating 21b. In other words, a coating 21b covers the outside surface of the in inward-facing collar section 13 and the outer surface of the continuous section between the inward-facing collar section 13 and the cylindrical section 11. The coating 21b does not cover the portion of the outer circumferential surface of the cylindrical section 11 that is separated from this continuous section that comes in sliding contact with the tip end edge of the radial seal lip 17a. The outer surface of the shell-type outer ring 9d does not absolutely need to be covered by a chemically treated film having anti-corrosive properties, however, when applied to uses in severe operating conditions, it is preferred that part or all of the shell-type outer ring 9d be covered with a chemically treated film, Particularly, when there is chemically treated film in the portion where the tip end edge of the radial seal lip 17a comes in sliding contact, wear of that portion is prevented to a certain extent.

With the cross-type universal joint of this example, even under severe operating conditions, it is difficult for foreign matter to get inside the shell-type outer ring 9d, and it is possible to achieve a cross-type universal joint for which is easier to maintain sufficient durability. In other words, with the construction of this example, the thrust seal lip 18 and the intermediate seal lip 22 have the same function as the two seal lips 17, 18 in the construction of the first embodiment (see FIG. 1). The advancement of the wear of the tip end edges of these two seal lips 18, 22 due to rubbing against the surface of the shell-type outer ring 9 that is rough due to rust is prevented.

Furthermore, in the case of the construction of this example, due to the existence of a radial seal lip 17a that is located the furthest on the outside, it is possible to lower the possibility of foreign matter on the outside from getting inside the internal space 23. Particularly, in this example, the tip end edge of the radial seal lip 17a comes in sliding contact with the straight portion of the outer circumferential surface of the shell-type outer ring 9d where there is no change in the outer diameter, so effects that are received due to the occurrence of spaces in the axial direction are prevented, and the seal performance is maintained. The tip end edge of this radial seal lip 17a comes in sliding contact with a portion where a corrosion-resistant coating is not formed, and that sliding contact is maintained, so there is a possibility that the tip end edge will wear due to changes in the characteristics of the outer surface of the cylindrical section 11. However, even though this tip end edge section may wear out, a labyrinth seal is formed between the tip end edge of this radial seal lip 17a and the outer circumferential surface of the shell-type outer ring 9d. Therefore, even when the tip end edge of the radial seal lip 17a is worn, it is possible to suppress the amount of foreign matter that enters toward the side of the two seal lips 18, 22. As a result, it is possible to keep the amount of foreign matter that reaches the area of sliding contact between the intermediate seal lip 22 and the thrust seal lip 18 and the outer surface of the shell-type outer ring 9d to a small amount, and the effect of preventing foreign matter from getting into the internal space 23 can be maintained well over a long period of time, so it is possible to adequately maintain the durability of the cross-type universal joint 1d. The construction and function of the other parts are the same as in the first embodiment.

[Embodiment 2, Example 2]

Figure 6:
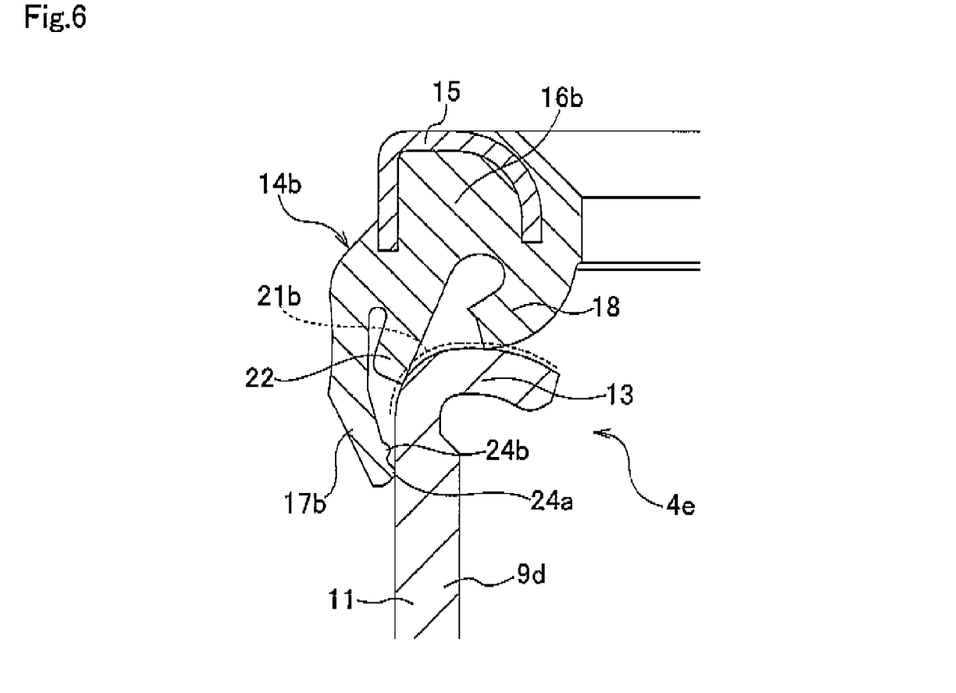
FIG. 6 illustrates a second example of a second embodiment of the present invention, and is similar to FIG. 5.

FIG. 6 illustrates a second example of the second embodiment of the present invention. In the case of this example, two protruding ridges 24a, 24b are formed around the entire circumference on the tip end edge of the radial seal lip 17b that is provided on an elastic member 16b in a portion that faces the outer circumferential surface of the cylindrical section 11 of the shell-type outer ring 9d, and are such that they are separated from each other in the axial direction. When the seal ring 14b is assembled in the universal joint, of these protruding ridges 24a, 24b, the protruding ridge 24a that is on the tip end side comes in sliding contact with the outer circumferential surface of the cylindrical section 11, and the tip end edge of the protruding ridge 24b on the base end side is separated a little from this outer circumferential surface.

In the case of the construction of this example, as the protruding ridge 24a of the tip end side wears over a long period of use, the protruding ridge 24b on the base end side that up to that point was separated from the outer circumferential surface of the cylindrical section 11 comes into sliding contact with this outer circumferential surface. After that, even when the protruding ridge 24b becomes worn, a labyrinth seal is formed between the tip end edge of the radial seal lip 17b and the outer circumferential surface of the shell-type outer ring 9d. As a result, the seal performance of the radial seal lip 17b can be more adequately maintained over a long period of time. The construction and function of the other parts are the same as in the first example of this second embodiment.

[Embodiment 2, Example 3]

Figure 7:
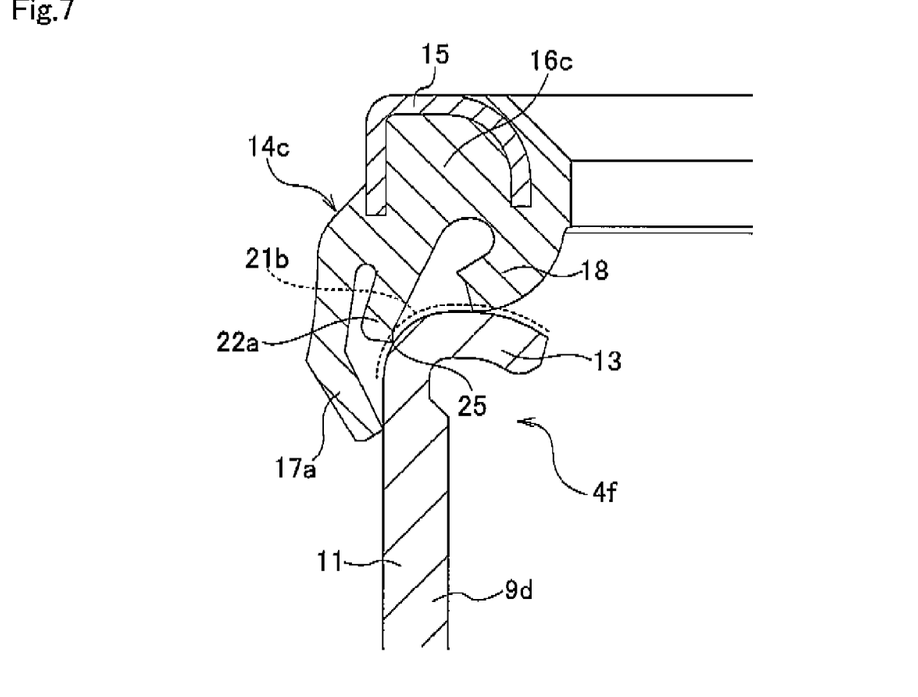
FIG. 7 illustrates a third example of a second embodiment of the present invention, and is similar to FIG. 5.

FIG. 7 illustrates a third example of the second embodiment of the present invention. In the case of this example, a protruding ridge 25 is formed on the tip end edge of the intermediate seal lip 22a that is provided on the elastic member 16c of the seal ring 14c in the portion that faces the outer surface of the shell-type outer ring 9d, and comes in sliding contact with all around this outer surface. In the case of the construction of this example, the state of sliding contact between the tip end edge of the intermediate seal lip 22a and the outer surface of the shell-type outer ring 9d is stabilized, and by suitably maintaining surface pressure at these areas of contact, it is possible to improve the seal performance. The construction and function of the other parts are the same as in the first example of this second embodiment.

[Embodiment 2, Example 4]

Figure 8:
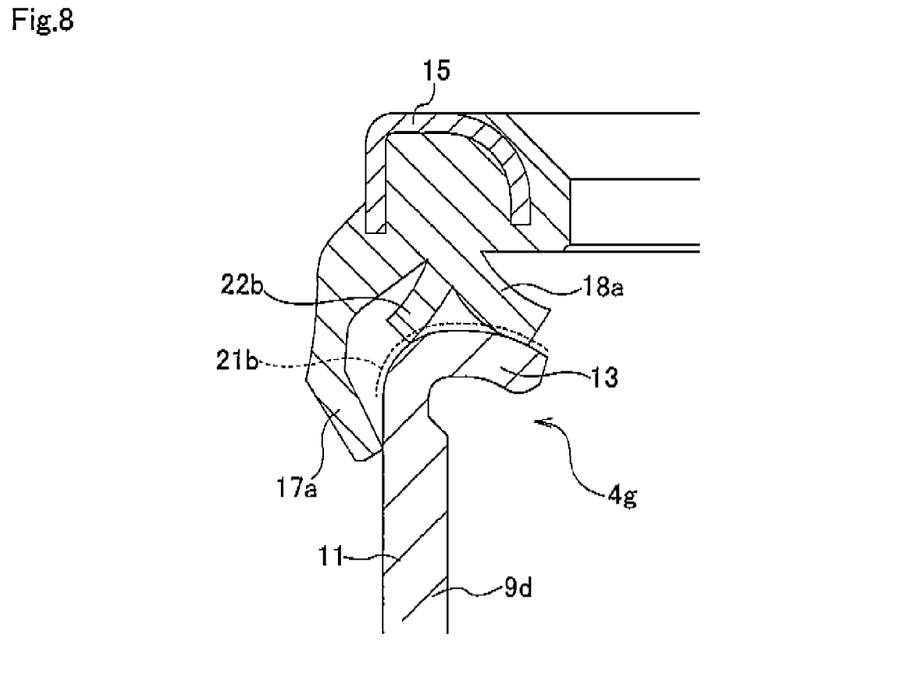
FIG. 8 illustrates a fourth example of a second embodiment of the present invention, and is similar to FIG. 5.

FIG. 8 illustrates a fourth example of the second embodiment of the present invention. In the case of this example, the shapes of the thrust seal lip 18a and the intermediate seal lip 22b are different than in examples 1 to 21 3 of this second embodiment. More specifically, these seal lips 18a, 22b are separated into two forks having the same base end in common with each other. The construction and function of the other parts are the same as in the first example of this second embodiment.

[Embodiment 2, Example 5]

Figure 9:
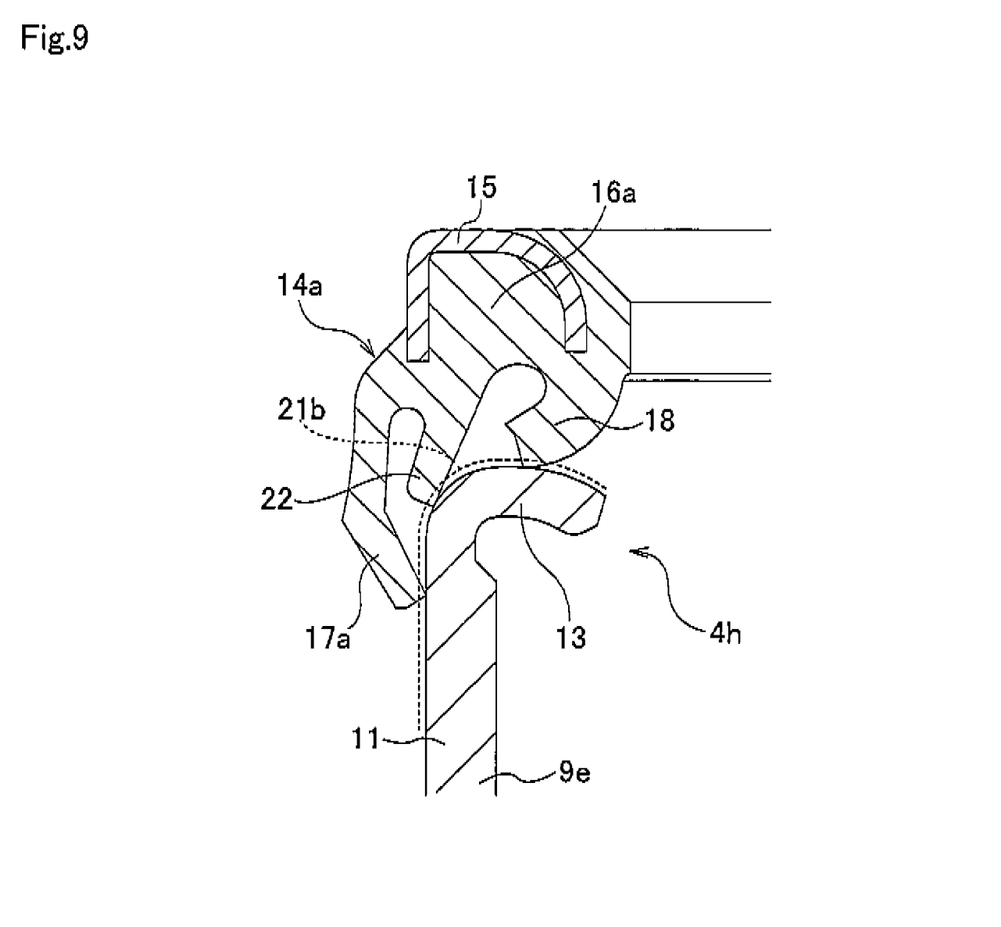
FIG. 9 illustrates a fifth example of a second embodiment of the present invention, and is similar to FIG. 5.

FIG. 9 illustrates a fifth example of the second embodiment of the present invention. In the case of this example, no only does a corrosion resistant coating 21b cover the portion of the outer surface of the opening end section side of the shell-type outer ring 9e where the inward-facing collar section 13 is formed that protrudes from the inside surface of the arm section 5a of the yoke 2a that comes in sliding contact with the tip end edges of the thrust lip 18 and intermediate seal lip 22, but also covers the portion that comes in sliding contact with the radial seal lip 17a. In other words, a coating 21b covers the outside surface of the inward-facing collar section 13, the outer surface of the continuous section between the inward-facing collar section 13 and the cylindrical section 11, and the portion near the other end in the axial direction of the outer peripheral surface of the cylindrical section 11. As a result, wear of the tip end edge of the radial seal lip 17a is effectively prevented, It is also possible to have the outer end section in the axial direction of the coating 21b extend up to a position that enters inside the circular hole 6a (6b) just a little (for example, 0.5 mm to 1 mm). The construction and function of the other parts are the same as in the first example of this second embodiment.

[Industrial Applicability]

The present invention can obtain a large effect when applied to a cross-type universal joint for a propeller shaft that undergoes extremely severe operating conditions from the aspect of maintaining resistance to wear, because foreign matter such as muddy water adheres easily, the operation speed is fast, and the rubbing speed between the tip end edges of the seal lips and the outer surface of the shell-type outer ring is fast. However, the present invention is not limited to a propeller shaft and could be applied for use in cross-type universal joints that are used in steering apparatuses, uses other than automobiles, or shell-type needle bearings that are used in these kinds of cross-type universal joints.

EXPLANATION OF REFERENCE NUMBERS 1, 1a to 1d Universal joint
2a, 2b Yoke
3 Joint cross
4, 4a to 4h Shell-type needle bearing
5a, 5b Arm section
6a, 6b Circular hole
7 Connection base section
8 Shaft section
9, 9a to 9d Shell-type outer ring
10 Needle
11 Cylindrical section
12 Bottom plate section
13 Inward-facing collar section
14, 14a to 14c Seal ring
15 Metal core
16, 16a to 16c Elastic member
17, 17a, 17b Radial seal lip
18, 18a Thrust seal lip
19, 19a Rust
20, 20a Space
21, 21a Coating
22, 22a, 22b Intermediate seal lip
23 Internal space
24a, 24b Protruding ridge
25 Protruding ridge

What is claimed is:

1. A shell-type needle bearing, comprising:
a shell-type outer ring that is formed by bending a metal plate and comprises a cylindrical section, a bottom plate section that covers the entire one end side in the axial direction of the cylindrical section, and an inward-facing collar section that is bent inward in the radial direction from the other end side in the axial direction of the cylindrical section, this shell-type outer ring during use being fastened inside a circular hole that is formed in an outside member; and
a plurality of needles that are provided on the inner-diameter side of the shell-type outer ring so as to be able to roll freely;
wherein a portion near the other end in the axial direction of the outer surface of the shell-type outer ring, where there is a possibility that a tip end edge of a seal lip of a seal ring that is fitted around and fastened to the outer circumferential surface of a shaft section that is inserted into the inner-diameter side of the needles will come in sliding contact, is covered by a corrosion resistant coating.

2. The shell-type needle bearing according to claim 1, wherein the outside surface of the inward-facing collar section and the outer surface of a continuous section between the inward-facing collar section and the cylindrical section are selectively covered by the corrosion resistant coating.

3. A cross-type universal joint, comprising:
a pair of yokes each formed in a forked shape and including a pair of arm sections, and circular holes that are formed in tip end sections of the arm sections so as to be coaxial with each other;
a joint cross that comprises a connection base section, and four shaft sections that are fastened to an outer surface of the connection base section in a radial manner, the joint cross being combined with the pair of yokes with the shaft sections inserted inside the circular holes respectively; and
four shell-type needle bearings that are provided between outer circumferential surfaces of the shaft sections and inner circumferential surfaces of the circular holes;
wherein the shell-type needle bearings are shell-type needle bearings according to claim 2.

4. The cross-type universal joint according to claim 3, further comprising four seal rings, each seal ring having:
a base section that is fastened around and supported by a base end section of a corresponding one of the shaft sections; and
a radial seal lip and a thrust seal lip that are provided between the base end section of the corresponding shaft section and an opening section of the corresponding shell-type outer ring, the radial seal lip coming in sliding contact with and all around an external circumferential surface of an axial end section of the shell-type outer ring that protrudes from the corresponding circular hole, and the thrust seal lip coming in sliding contact with and all around an external surface of an inward-facing collar section of the shell-type outer ring;
wherein the external circumferential surface of the axial end section and the external surface of the inward-facing collar section of each shell-type outer ring are continuously covered with a corrosion resistant coating.

5. The cross-type universal joint according to claim 3, further comprising four seal rings, each seal ring having:
a base section that is fastened around and supported by a base end section of a corresponding one of the shaft sections; and
seal lips that are provided between the base end section of the corresponding shaft section and an opening section of the corresponding shell-type outer ring, each of the seal lips having a tip end edge that comes in sliding contact with and all around an external surface of an axial end portion of the corresponding shell-type outer ring that protrudes from an inside surface of the corresponding arm section;
wherein a portion of the external surface of the protruding axial end portion of each shell-type outer ring that comes in sliding contact with the tip end edges of at least two of the seal lips, other than a seal lip that is furthest on the outside of the seal lips, is covered with the corrosion resistant coating.

6. The cross-type universal joint according to claim 5, wherein the portion of the external surface of the protruding axial end portion that comes in sliding contact with the tip end edges of all of the seal lips is covered with the corrosion resistant coating.

7. A cross-type universal joint, comprising:
a pair of yokes each formed in a forked shape and including a pair of arm sections, and circular holes that are formed in tip end sections of the arm sections so as to be coaxial with each other;
a joint cross that comprises a connection base section, and four shaft sections that are fastened to an outer surface of the connection base section in a radial manner, the joint cross being combined with the pair of yokes with the shaft sections inserted inside the circular holes respectively; and
four shell-type needle bearings that are provided between outer circumferential surfaces of the shaft sections and inner circumferential surfaces of the circular holes;
wherein the shell-type needle bearings are shell-type needle bearings according to claim 1.

8. The cross-type universal joint according to claim 7, further comprising four seal rings, each seal ring having:
a base section that is fastened around and supported by a base end section of a corresponding one of the shaft sections; and
a radial seal lip and a thrust seal lip that are provided between the base end section of the corresponding shaft section and an opening section of the corresponding shell-type outer ring, the radial seal lip coming in sliding contact with and all around an external circumferential surface of an axial end section of the shell-type outer ring that protrudes from the corresponding circular hole, and the thrust seal lip coming in sliding contact with and all around an external surface of an inward-facing collar section of the shell-type outer ring;
wherein the external circumferential surface of the axial end section and the external surface of the inward-facing collar section of each shell-type outer ring are continuously covered with a corrosion resistant coating.

9. The cross-type universal joint according to claim 7, further comprising four seal rings, each seal ring having:
a base section that is fastened around and supported by a base end section of a corresponding one of the shaft sections; and
seal lips that are provided between the base end section of the corresponding shaft section and an opening section of the corresponding shell-type outer ring, each of the seal lips having a tip end edge that comes in sliding contact with and all around an external surface of an axial end portion of the corresponding shell-type outer ring that protrudes from an inside surface of the corresponding arm section;
wherein a portion of the external surface of the protruding axial end portion of each shell-type outer ring that comes in sliding contact with the tip end edges of at least two of the seal lips, other than a seal lip that is furthest on the outside of the seal lips, is covered with the corrosion resistant coating.

10. The cross-type universal joint according to claim 9, wherein the portion of the external surface of the protruding axial end portion that comes in sliding contact with the tip end edges of all of the seal lips is covered with the corrosion resistant coating.

11. The shell-type needle bearing according to claim 1, wherein the bottom plate section is located on the inside of the circular hole, and the outside surface of this bottom plate section is covered by the corrosion resistant coating.

12. A cross-type universal joint, comprising:
a pair of yokes each formed in a forked shape and including a pair of arm sections, and circular holes that are formed in tip end sections of the arm sections so as to be coaxial with each other;
a joint cross that comprises a connection base section, and four shaft sections that are fastened to an outer surface of the connection base section in a radial manner, the joint cross being combined with the pair of yokes with the shaft sections inserted inside the circular holes respectively; and
four shell-type needle bearings that are provided between outer circumferential surfaces of the shaft sections and inner circumferential surfaces of the circular holes;
wherein the shell-type needle bearings are shell-type needle bearings according to claim 11.

13. The cross-type universal joint according to claim 12, further comprising four seal rings, each seal ring having:
a base section that is fastened around and supported by a base end section of a corresponding one of the shaft sections; and
a radial seal lip and a thrust seal lip that are provided between the base end section of the corresponding shaft section and an opening section of the corresponding shell-type outer ring, the radial seal lip coming in sliding contact with and all around an external circumferential surface of an axial end section of the shell-type outer ring that protrudes from the corresponding circular hole, and the thrust seal lip coming in sliding contact with and all around an external surface of an inward-facing collar section of the shell-type outer ring;
wherein the external circumferential surface of the axial end section and the external surface of the inward-facing collar section of each shell-type outer ring are continuously covered with a corrosion resistant coating.

14. The cross-type universal joint according to claim 12, further comprising four seal rings, each seal ring having:
a base section that is fastened around and supported by a base end section of a corresponding one of the shaft sections; and
seal lips that are provided between the base end section of the corresponding shaft section and an opening section of the corresponding shell-type outer ring, each of the seal lips having a tip end edge that comes in sliding contact with and all around an external surface of an axial end portion of the corresponding shell-type outer ring that protrudes from an inside surface of the corresponding arm section;
wherein a portion of the external surface of the protruding axial end portion of each shell-type outer ring that comes in sliding contact with the tip end edges of at least two of the seal lips, other than a seal lip that is furthest on the outside of the seal lips, is covered with the corrosion resistant coating.

15. The cross-type universal joint according to claim 14, wherein the portion of the external surface of the protruding axial end portion that comes in sliding contact with the tip end edges of all of the seal lips is covered with the corrosion resistant coating.

16. A cross-type universal joint, comprising:

a pair of yokes each formed in a forked shape and including a pair of arm sections, and circular holes that are formed in tip end sections of the arm sections so as to be coaxial with each other;

a joint cross that comprises a connection base section, and four shaft sections that are fastened to an outer surface of the connection base section in a radial manner, the joint cross being combined with the pair of yokes with the shaft sections inserted inside the circular holes respectively;

four shell-type needle bearings that are provided between outer circumferential surfaces of the shaft sections and inner circumferential surfaces of the circular holes; and four seal rings;

wherein each of the four shell-type needle bearings comprises:

a shell-type outer ring that is formed by bending a metal plate and comprises a cylindrical section, a bottom plate section that covers the entire one end side in the axial direction of the cylindrical section, and an inward-facing collar section that is bent inward in the radial direction from the other end side in the axial direction of the cylindrical section, this shell-type outer ring during use being fastened inside a circular hole that is formed in an outside member; and a plurality of needles that are provided on the inner-diameter side of the shell-type outer ring so as to be able to roll freely; and at least part of a portion of the outer surface of the shell-type outer ring that is separated from the circular hole is covered by a corrosion resistant coating, and wherein each of the four seal rings has:

a base section that is fastened around and supported by a base end section of a corresponding one of the shaft sections; and a radial seal lip and a thrust seal lip that are provided between the base end section of the corresponding shaft section and an opening section of the corresponding shell-type outer ring, the radial seal lip coming in sliding contact with and all around an external circumferential surface of an axial end section of the shell-type outer ring that protrudes from the corresponding circular hole, and the thrust seal lip coming in sliding contact with and all around an external surface of an inward-facing collar section of the shell-type outer ring;

wherein the external circumferential surface of the axial end section and the external surface of the inward-facing collar section of each shell-type outer ring are continuously covered with a corrosion resistant coating.

17. A cross-type universal joint, comprising:

a pair of yokes each formed in a forked shape and including a pair of arm sections, and circular holes that are formed in tip end sections of the arm sections so as to be coaxial with each other;

a joint cross that comprises a connection base section, and four shaft sections that are fastened to an outer surface of the connection base section in a radial manner, the joint cross being combined with the pair of yokes with the shaft sections inserted inside the circular holes respectively;

four shell-type needle bearings that are provided between outer circumferential surfaces of the shaft sections and inner circumferential surfaces of the circular holes; and four seal rings;

wherein each of the four shell-type needle bearings comprises:

a shell-type outer ring that is formed by bending a metal plate and comprises a cylindrical section, a bottom plate section that covers the entire one end side in the axial direction of the cylindrical section, and an inward-facing collar section that is bent inward in the radial direction from the other end side in the axial direction of the cylindrical section, this shell-type outer ring during use being fastened inside a circular hole that is formed in an outside member; and a plurality of needles that are provided on the inner-diameter side of the shell-type outer ring so as to be able to roll freely; and at least part of a portion of the outer surface of the shell-type outer ring that is separated from the circular hole is covered by a corrosion resistant coating, and wherein each of the four seal rings has:

a base section that is fastened around and supported by a base end section of a corresponding one of the shaft sections; and seal lips that are provided between the base end section of the corresponding shaft section and an opening section of the corresponding shell-type outer ring, each of the seal lips having a tip end edge that comes in sliding contact with and all around an external surface of an axial end portion of the corresponding shell-type outer ring that protrudes from an inside surface of the corresponding arm section;

wherein a portion of the external surface of the protruding axial end portion of each shell-type outer ring that comes in sliding contact with the tip end edges of at least two of the seal lips, other than a seal lip that is furthest on the outside of the seal lips, is covered with the corrosion resistant coating.

* * * * *